April 27, 1926.
H. V. JAMES
1,582,755
ELECTRIC BRAKING MECHANISM
Filed Dec. 17, 1924
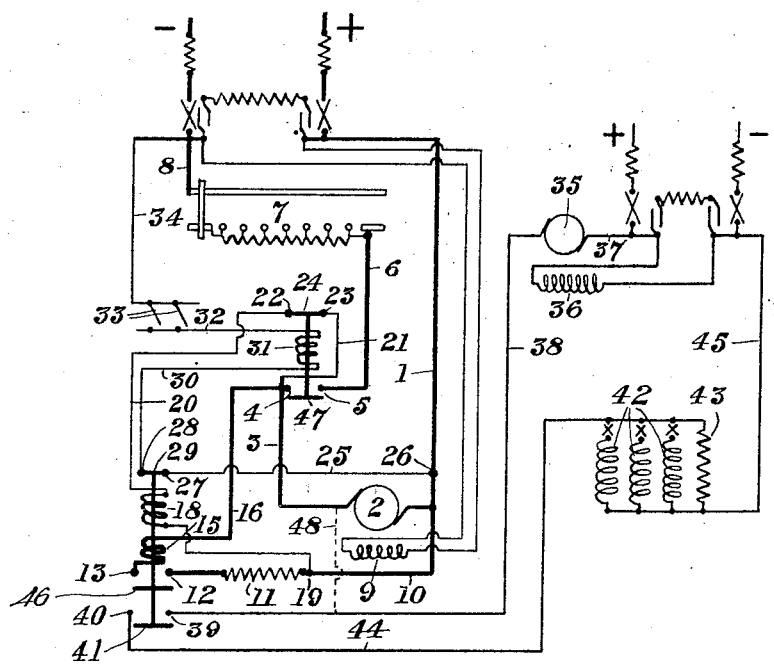
Inventor
H. V. James,
by [signature] Atty.

Patented Apr. 27, 1926.

1,582,755

UNITED STATES PATENT OFFICE.

HENRY VINCENT JAMES, OF RADLETT, ENGLAND.

ELECTRIC BRAKING MECHANISM.

Application filed December 17, 1924. Serial No. 756,603.

*To all whom it may concern:*

Be it known that HENRY VINCENT JAMES, a British subject, residing at "Cintra" Malt Lane, Radlett, in the county of Hertfordshire, England, has invented certain new and useful Improvements in or Relating to Electric Braking Mechanism, of which the following is a specification.

This invention relates to an improved method of applying the brakes of machines, particularly referring to multiple unit machines, such as printing, paper-making, and textile machines of which the rotating parts must be stopped simultaneously, and for which a number of brakes are provided at various positions on the machine for the purpose. In such machines it is also desirable to stop quickly but evenly and without shock which necessitates a light initial brake torque gradually increasing to maximum as the machine speed is reduced and finally stopped.

Broadly the invention consists in applying to such machines an electrodynamic machine driven from any suitable part of the former, this electrodynamic machine being adapted when the machine is being stopped, to set up a counter E. M. F. to the line-service feeding the brake energizing means in such a manner that as the machine is slowed down and therewith also the electrodynamic machine, the counter E. M. F. set up by the latter gradually decreases whilst the effective E. M. F. across the brake energizing means is gradually and proportionately increased to maximum as the machine and electrodynamic machine come to rest.

During normal running of the main driving motor of the machine, or when this is at rest, the line connecting the electrodynamic machine to the brake energizing coil is interrupted and is only closed when the motor is de-energized and is actually slowing down. Instead of using a separate electrodynamic machine the main driving motor itself if suitably wound and balanced may be used.

For the purpose of controlling the various circuits, coil operated magnet switches or solenoids are provided and so arranged that when the circuit of the driving motor is broken a dynamic braking circuit for the driving motor and the circuit for the brake energizing means are closed, these circuits being again broken as soon as the driving motor and machine come to rest.

In the accompanying drawings is illustrated a circuit diagram of a preferred arrangement according to the invention, the machine being assumed to be at rest.

From the + main runs a line 1 to the armature 2 of a driving motor, line 3, contact 4, switch 47, contact 5, line 6, controller 7, and line 8 to — main, which completes a feed circuit to armature 2. The motor field is indicated at 9. From the line 1, passes a supplementary circuit including line 10, a dynamic braking resistance 11, contact 12, switch 46, contact 13, coil 15, of a differentially wound solenoid, and a line 16, connected at 4 to line 3 leading from the armature 2. This circuit is in parallel with the armature 2, and forms a dynamic braking circuit of the latter.

The second coil 18, of the differentially wound solenoid, is connected to the armature line 10 at 19, and by line 20, contact 22, switch 24, contact 23, and line 21 to contact 4 connected by line 3 to the other side of armature 2. This circuit is in parallel with the resistance 11 and coil 15. A starting circuit includes a line 25, connected to the line 1 at 26, contacts 27 and 28, bridged by a switch 29, a line 30, a solenoid coil 31, line 32, a number of control switches or buttons 33, arranged in parallel to one another, and a line 34 leading to the — main.

The separately excited electrodynamic machine driven by the machine is indicated at 35 and its field at 36. One side of the armature is connected to the + main by a line 37, and the other side is connected by a line 38 leading to a contact 39 adapted to be connected to a contact 40 by a switch 41.

Brake energizing coils are indicated at 42 and a discharge resistance is shown at 43. The energizing coils 42 and the resistance 43 are shown in parallel, but it will be understood that the coils may be arranged in series. The contact 40 is connected by a line 44 to one set of ends of the energizing coils 42 and resistance 43, and the other ends of these coils and resistance are connected by the line 45 to the — main.

The core of the differential solenoid 15—18 carries the switch 29 for bridging the contacts 27 and 28, the switch 46 for bridging contacts 12 and 13, and the switch 41 for bridging contacts 39 and 40

The core of the solenoid 31 carries the switch 24 for bridging the contacts 22 and 23, and the switch 47 for bridging contacts 4 and 5.

To start the machine one of the switches 33 is closed. Current then flows from + main through lines 1 and 25, contacts 27 and 28, normally bridged by the switch 29, line 30, coil 31, line 32, switch 33 and line 34 to — main.

The coil 31 is thus energized causing the switch 47 to bridge contacts 4 and 5 and open the switch 24 which bridges contacts 22 and 23. Current will now flow from + main, through line 1, motor armature 2, line 3, contact 4, switch 47, contact 5, line 6, controller 7, and line 8 to — main. The motor will then start up and can be controlled by operating the controller 7.

For stopping the machine the switch 33 is opened. The solenoid 31 is thus de-energized so that the switch 47 opens and thus breaks the motor circuit at the contacts 4 and 5, whilst the switch 24 is closed and bridges contacts 22 and 23. A dynamic circuit is now established from armature 2 through line 10, coil 18, line 20, contacts 22 and 23, bridged by switch 24, line 21, contact 4, and line 3 back to armature 2. The coil 18 is thus energized and closes switches 46 and 41. A dynamic braking circuit is now also established from armature 2 through line 10, dynamic brake resistance 11, contact 12, switch 46, contact 13, coil 15, line 16, contact 4 and line 3 back to armature 2. The coil 15 is thus energized and assists in holding switch 46 closed. As the E. M. F. across the motor 2 dies down the energy in 18 also dies down, but as coil 15 is in series with the resistance 11 it remains energized until the motor 2 is practically at rest and thus holds the switches 46 and 41 closed.

By the switch 41 a circuit is closed from the + main, line 37, electrodynamic machine 35, line 38, contact 39, switch 41, contact 40, line 44, coils 42 and resistance 43 in parallel, and line 45 to — main.

Electrodynamic machine 35 is so wound and mechanically connected to the driven machine that when the latter is in full speed an E. M. F. exists across armature 35 equal to that of the line and counter to it.

It will be obvious therefore that if while running at full speed the main driving motor and machine are stop operated and a circuit is established through armature 35, switch 41, brake operating coils 42 and — line, practically no initial energy will exist in the circuit due to the opposing E. M. F. of armature 35 to that of the line, but as the speed of the latter decreases and likewise its E. M. F. energy in the circuit will increase and an effective E. M. F. is gradually built up across the brake coils 42 until it practically equals that of the line as armature 35 comes to rest.

It will also be clear that if while the main driving motor and machine are running at say half speed the combination is stop operated, the initial effective value of the brake coil energizing circuit will be approximately proportionate to the speed and likewise effective.

The coils 15, 18 of the differential solenoid serve also as a timing device as they hold the feed circuit to the brake coils closed after the driving motor circuit is broken until the machine comes to rest, when normal conditions are again automatically established.

If desired a timing device of any known or suitable kind could also be used.

It will also be observed that by means of the arrangement hereinbefore described the solenoids are so arranged that the circuit of the driving motor cannot be closed at the same time as the brake circuit.

When the driving motor 2 is adapted to be used in place of the electrodynamic machine 35, it is connected to the line 38 as indicated by the dotted line 48, the machine 35 and its field 36 and the line 37 being omitted.

What I claim is:—

1. A method for braking driven machines, consisting in providing brake energizing coils for controlling the brakes and fed from a line service, providing an electrodynamic machine mechanically coupled to the driven machine and utilizing the output of the electrodynamic machine to set up a counter E. M. F. to the current of the braking energizing coils, whereby in a reduction of speed in a driven machine the counter E. M. F. of the electrodynamic machine is gradually reduced to permit a braking effective E. M. F. across the brake energizing coils.

2. A method of braking driven machines, consisting in providing brake energizing coils open to the line service and utilizing the speed of the driven machine to set up a counter E. M. F. to the line service, feeding the brake energizing coils as long as the driven machine is at speed, a speed reduction of the driven machine disturbing the neutralizing effect of the counter E. M. F. and permitting the E. M. F. of the brake energizing coils to control the brakes in direct proportion to the speed reduction of the driven machine.

3. A method of braking driven machines, consisting in providing electrically controlled brake operating means normally inactive while the driven machine is at speed, providing means for producing a current by the driven machine to normally neutralize the current effect on the brake energizing coils, with such current producing means of gradually reducing neutralizing effect as the speed of the driven machine is decreased to thereby permit a gradually increasing effect of the braking means in proportion to the reduction of speed of the driven machine.

4. A method of braking driven machines, consisting in providing electrically controlled brake operating means normally inactive while the driven machine is at speed, providing means for producing a current by the driven machine to normally neutralize the current effect on the brake energizing coils, with such current producing means of gradually reducing neutralizing effect as the speed of the driven machine is decreased to thereby permit a gradually increasing effect of the braking means in proportion to the reduction of speed of the driven machine, the braking means and neutralizing means being wholly inoperative when the driven machine is at speed or at rest.

5. A method of braking driven machines, consisting in providing electrically controlled brake operating means normally inactive while the driven machine is at speed, providing means for producing a current by the driven machine to normally neutralize the current effect on the brake energizing coils, with such current producing means of gradually reducing neutralizing effect as the speed of the driven machine is decreased to thereby permit a gradually increasing effect of the braking means in proportion to the reduction of speed of the driven machine, the braking means and neutralizing means being wholly inoperative when the driven machine is at speed or at rest and being automatically effective when the power of the driven machine is cut off.

6. In a braking system for driven machines, including brake energizing coils, an electrodynamic machine operated by the driven machine and circuited to set up an E. M. F. counter to that of the brake energizing coils, whereby as the driven machine and therefore the electrodynamic machine are reduced in speed, the E. M. F. of the brake energizing coils is operatively effective for brake purposes.

7. A braking system for driven machines including brake energizing coils, current feeders therefor, an electrodynamic machine operated by the driven machine and coupled to generate a current counter to that of the brake energizing coils to prevent braking service from said coils while the driven machine is at speed and to permit braking service from said coils as the speed of the driven machine and therefore of the electrodynamic machine is reduced, and means whereby the braking system is without energy while the driven machine is under power.

8. A braking system for driven machines including brake energizing coils, current feeders therefor, an electrodynamic machine operated by the driven machine and coupled to generate a current counter to that of the brake energizing coils to prevent braking service from said coils while the driven machine is at speed and to permit braking service from said coils as the speed of the driven machine and therefore of the electrodynamic machine is reduced, and means whereby the braking system is without energy while the driven machine is under power or at rest.

In testimony whereof I affix my signature.

HENRY VINCENT JAMES.